Patented Dec. 18, 1951

2,578,684

UNITED STATES PATENT OFFICE 2,578,684

GLYCOL ESTERS OF ACYLOXYCARBOXYLIC ACIDS

Edward M. Filachione, Philadelphia, Pa., Martin L. Fein, Riverside, N. J., and Charles H. Fisher, Abington, Pa., assignors to the United States of America as represented by the Secretary of Agriculture No Drawing. Application June 18, 1948, Serial No. 33,837

8 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application is a continuation-in-part of our copending application for patent, Serial No. 770,179, filed August 22, 1947, now Patent No. 2,534,255, the disclosure of which is incorporated herein by reference.

This invention relates to glycol esters of acyloxycarboxylic acids and has among its objects the provision of such esters and processes for their preparation. Other objects and advantages will be apparent from the description of the invention.

We have found that glycol esters of acyloxycarboxylic acids, which possess valuable properties as solvents, plasticizers and modifying agents for plastic compositions, can be obtained by reacting a glycol, or a glycol ester containing at least one unsubstituted hydroxyl group, with an ester of a hydroxycarboxylic acid and treating the resulting glycol ester thus formed by alcoholysis, with an acylating agent.

According to the invention the glycol, or glycol ester containing at least one unsubstituted hydroxyl group, is subjected to alcoholysis by heating at reaction temperature with an alkyl ester of a hydroxycarboxylic acid, preferably in the presence of a reaction catalyst and with concurrent removal from the reaction mixture, of the alkanol formed in the alcoholysis process. The glycol ester thus obtained is then acylated by interaction with an organic acylating agent to form glycol esters corresponding to the general formula

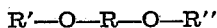

R'—O—R—O—R"

wherein R is an alkylene radical containing from 2 to 6 carbon atoms, and R' and R" are acyl radicals of saturated aliphatic monocarboxylic acids at least one of said acyl radicals being derived from an alpha-acyloxycarboxylic acid.

The process of this invention is applicable to glycols in general; that is, to aliphatic dihydric alcohols, such as ethylene glycol, propanediol 1,2 and 1,3, butanediol 1,3; 2,3; and 1,4; pentanediol 1,2; 1,4 and 1,5; hexanediol 1,6; 2-ethylhexanediol 1,3, and the like, and to the esters of aliphatic dihydric alcohols which contain at least one free hydroxyl group. Suitable esters include, for example, the monoesters of the above-listed glycols with saturated aliphatic monocarboxylic acids containing from 5 to 18 carbon atoms, like caproic, caprylic, lauric, palmitic or stearic acid; hydroxycarboxylic acids like glycolic or lactic acid; and diesters of saturated aliphatic dicarboxylic acids like succinic, adipic, sebacic, azelaic, diglycolic, and the like.

Esters of hydroxycarboxylic acids adapted for use in the alcoholysis process are the lower alkyl esters such as methyl, ethyl and propyl esters of the lower, saturated, aliphatic, alpha-hydroxymonocarboxylic acids like glycolic and lactic acid or alpha-hydroxyisobutyric acid.

Suitable alcoholysis catalysts include acidic substances such as sulfuric or toluene sulfonic acids, as well as other esterification catalysts, like metal alcoholates, as for instance, aluminum ethoxide and aluminum isopropoxide.

The products of the alcoholysis reaction can be acylated in a conventional manner by treatment with an organic acylating agent. Suitable acylating agents include ketene and the anhydrides or halides of carboxylic acids, as for example, acetic anhydride, propionic anhydride, acetoxypropionyl chloride, pelargonyl chloride, and so forth.

Since in the alcoholysis process the alkyl esters of hydroxycarboxylic acids are capable of reacting not only with the alcohol groups of the glycol radicals but also with the other hydroxyl groups of the reactants and reaction products the process usually yields products comprising a number of components. The composition of the product obtained and the molecular weight of the predominant constituents can be controlled within certain limits by varying the proportions of the reactants, the duration of the alcoholysis process and the amount of alkylol removed from the reaction mixture.

The following Examples I to III, inclusive, illustrate the preparation of glycol esters of the present invention.

EXAMPLE I

*Preparation of ethylene glycol monolactate diacetoxypropionate*

A mixture of 869 g. (14 moles) ethylene glycol, 728 g. (7 moles) methyl lactate and 7 g. aluminum isopropoxide, was heated at atmospheric pressure in a flask fitted with a 2-foot Vigreaux-type distilling column. Approximately 282 cc. methanol distilled from the reaction mixture. Low-boiling components were then removed by heating the contents of the flask at about 100°

C. under a vacuum of 2–3 mm. until distillation ceased. The residual product consisted essentially of ethylene glycol monolactate.

134.13 g. (1 mole) of the ethylene glycol monolactate, prepared as described above, were treated with 301.12 g. (2 moles) alpha-acetoxy-propionyl chloride in the presence of 200 g. pyridine and 300 ml. benzene. During the addition of the acylating agent the temperature of the reaction mixture was maintained below 20° C. by cooling the flask with ice-water. When the acylation was completed, water was added to dissolve the pyridine hydrochloride precipitate. The oil layer thus obtained was separated, washed several times with concentrated aqueous solution of sodium chloride, dried over anhydrous sodium sulfate and distilled to remove the benzene. The residual material was then distilled in vacuum yielding a middle fraction boiling at 175°–180° C./0.4 mm., which consisted essentially of ethylene glycol monolactate diacetoxypropionate having the following characteristics: $n_D^{20} = 1.4416$; $d_4^{20} = 1.1963$; and ester equivalent = 73.1.

EXAMPLE II

*Preparation of the 1,5-pentanediol dilactate dipropionate and di-(2-ethylhexoate)*

A mixture of technical grade 1,5-pentanediol (2-moles, 208 g.), methyl lactate (6 moles, 624 g.) and 3 grams of p-toluenesulfonic acid (monohydrate) catalyst was heated at atmospheric pressure in a flask fitted with a 2-foot Vigreaux-type distilling column. 162 ml. methanol was distilled from the reaction mixture over a period of about 5 hours while the temperature in the flask rose from 107° C. to 152° C. After allowing the flask to cool, the excess methyl lactate was distilled under reduced pressure. The distillation residue, consisting essentially of 1,5-pentanediol dilactate, was divided into two equal portions, each approximately equivalent to one-half mole.

One portion was treated with an equivalent amount of propionic anhydride to acylate the free hydroxyl groups. Propionic acid was distilled at reduced pressure, and residual free acidity was washed out of an ether solution of the product with water and NaHCO$_3$ solution. The final product, 1,5-pentanediol dilactate dipropionate, when dry and free of ether, had an index of refraction ($N_D^{20}$) of 1.4402.

The other portion of 1,5-pentanediol dilactate was treated with a slight excess of 2-ethylhexoyl chloride using the following procedure:

The chloride was added in small quantities to a cooled, stirred solution of the dilactate in 200 ml. of ether and dry pyridine (weight equivalent to that of 2-ethylhexoyl chloride). When reaction seemed to be complete, 100 ml. water was added to dissolve the pyridine hydrochloride formed in the reaction. The oil layer was separated and washed with dilute HCl solution several times, then with water and NaHCO$_3$—NaCl solution until acid free. The final product, 1,5-pentanediol dilactate di-(2-ethylhexoate), when dry and ether free, had an index of refraction ($N_D^{20}$) of 1.4458.

EXAMPLE III

*Preparation of the 1,5-pentanediol dilactyllactatedipropionate and acetate*

Using the ester interchange procedure described in the foregoing examples 104 g. (1 mole) 1,5-pentanediol were reacted with 624 g. (6 moles) methyl lactate in the presence of 2 g. toluene sulfonic acid. The product thus obtained, consisting essentially of 1,5-pentanediol lactyllactate, was divided into two equal portions which were treated with acetic anhydride and propionic anhydride respectively, using a small amount of concentrated sulfuric acid as catalyst. The acylation products recovered from the reaction mixtures by methods analogous to those described in the foregoing examples were washed acid free and had the following characteristics:

1,5-pentanediol polyactate propionate, $N_D^{20} = 1.4410$, ester eq. = 87; $d_4^{20} = 1.1275$; 1,5-pentanediol polylactate acetate, $N_D^{20} = 1.4410$, ester eq. = 80; $d_4^{20} = 1.1523$.

EXAMPLE IV

*Preparation of ethylene glycol adipate lactate propionate*

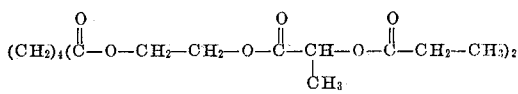

Ethylene glycol adipate was prepared by reacting 292 g. (2 moles) adipic acid with 248 g. (4 moles) ethylene glycol, using 1 ml. concentrated H$_2$SO$_4$ as catalyst and 300 ml. benzene as entraining agent. When the esterification reaction was complete (approximately 4 hours), the entraining agent was removed by distillation.

One mole ethylene glycol adipate (one-half the material described above) was reacted with 5 moles methyl lactate with 1 gram p-toluene sulfonic acid (monohydrate) as catalyst. This ester interchange yielded approximately 2 moles methanol in about 4 hours. The excess methyl lactate was distilled under reduced pressure and the residue, consisting essentially of ethylene glycol adipate lactate, was then treated with propionic anhydride, using about 1.05 equivalents of anhydride to acylate all hydroxyl groups. After distillation of propionic acid formed in acylation, the product was dissolved in ether and washed acid-free with NaCl and NaHCO$_3$ solutions. The ether layer was then dried and the ether distilled. The final product, essentially ethylene glycol adipate lactate propionate, had the following index of refraction: $n_D^{20} = 1.4496$.

In the foregoing examples methyl lactate can be replaced by an equivalent amount of another lower alkyl ester of lactic acid, such as ethyl or propyl lactate, and other esterification catalysts, for example sulfuric acid or aluminum epoxide, may be used in the alcoholysis reaction. Analogous results are also obtained using esters of other lower alpha-hydroxy carboxylic acids like glycolic acid, and other acylating agents.

The following examples illustrate the use of the compounds of this invention with synthetic plastics such as organic cellulose esters, cellulose ethers, and polyvinyl compounds in the production of plastic compositions.

EXAMPLE V 4.8 g. of cellulose acetate and 1.2 g. of the ethylene glycol monolactate diacetoxypropionate of Example I were dissolved in acetone. The resulting clear solution was poured into a Petri dish and covered with a watch glass to allow slow evaporation of the solvent. The clear, dry, tough and flexible film thus obtained remained essentially unchanged on heating at 65° C. for several hours.

EXAMPLE VI

Following the procedure described in the foregoing example and using cellulose acetate butyrate instead of cellulose acetate a film having characteristics similar to that of the film of Example V was obtained.

EXAMPLE VII 4.8 g. of ethyl cellulose and 1.2 g. of the 1,5-pentanediol polylactate acetate of Example III were dissolved in a solvent mixture consisting of 40 ml. toluene and 10 ml. ethanol. The clear solution was allowed to evaporate slowly in a covered Petri dish. A clear, dry, tough flexible film was formed. A similar film was obtained using 1,5-pentanediol polylactate propionate as the plasticizing agent.

EXAMPLE VIII

Clear, dry, tough and flexible films were obtained by the procedure described in Example V using 1,5-pentanediol polylactate acetate or propionate instead of ethylene glycol monolactate diacetoxypropionate as the plasticizing agent.

EXAMPLE IX 35 parts of a copolymer of 95 parts vinyl chloride and 5 parts vinyl acetate were combined with 15 parts of 1,5-pentanediol polylactate propionate on the compounding mill, and the resulting sheet molded at 300° F. and 12T total pressure for 2 minutes. The product showed satisfactory compatibility following conditioning for 64 hours at 77° F. and 50% R. H.

Having thus described our invention we claim:

1. A process comprising subjecting a compound selected from the group consisting of a glycol containing from 2 to 6 carbon atoms and a saturated ester of said glycol containing at least one free hydroxyl group to alcoholysis by heating it at reaction temperature and in the presence of an esterification catalyst, with a lower alkyl ester of a lower aliphatic alpha-hydroxymonocarboxylic acid, with concurrent removal of the alcohol formed from the reaction mixture, and then reacting the resulting glycol ester with an acylating agent.

2. A process comprising subjecting ethylene glycol to alcoholysis by heating it at reaction temperature and in the presence of an esterification catalyst, with methyl lactate, with concurrent removal of the methanol formed from the reaction mixture, and then reacting the resulting glycol ester, which consists essentially of ethylene glycol monolactate, with alpha-acetoxy-propionyl chloride as an acylating agent to produce ethylene glycol monolactate diacetoxypropionate.

3. A process comprising subjecting 1,5-pentanediol to alcoholysis by heating it at reaction temperature and in the presence of an esterification catalyst, with methyl lactate, with concurrent removal of the methanol formed from the reaction mixture, and then reacting the resulting glycol ester, which consists essentially of 1,5-pentanediol lactyllactate, with propionic anhydride as an acylating agent to produce 1,5-pentanediol dilactyllactate dipropionate.

4. A process comprising subjecting ethylene glycol adipate to alcoholysis by heating it at reaction temperature and in the presence of an esterification catalyst, with methyl lactate, with concurrent removal of the methanol formed from the reaction mixture, and then reacting the resulting glycol ester, which consists essentially of ethylene glycol adipate lactate, with propionic anhydride as an acylating agent to produce ethylene glycol adipate lactate propionate.

5. A compound selected from the group consisting of ethylene glycol monolactate diacetoxypropionate, 1,5-pentanediol dilactyllactate dipropionate, and ethylene glycol adipate lactate propionate.

6. Ethylene glycol monolactate diacetoxypropionate having the formula

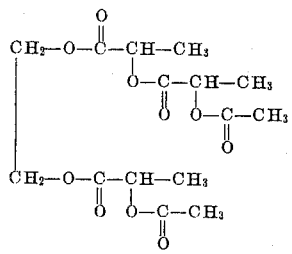

7. 1,5-pentanediol dilactyllactate dipropionate having the formula

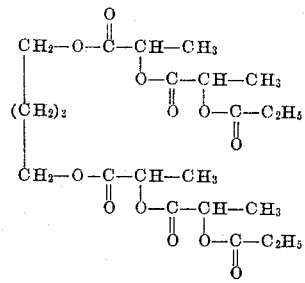

8. Ethylene glycol adipate lactate propionate having the formula

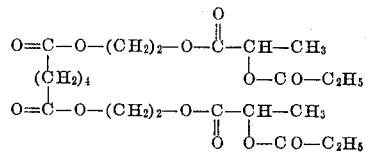

EDWARD M. FILACHIONE.
MARTIN L. FEIN.
CHARLES H. FISHER.

REFERENCES CITED

The following references are of record in the file of this patent:

UNITED STATES PATENTS

| Number | Name | Date |
| --- | --- | --- |
| 2,072,102 | Dreyfus | Mar. 2, 1937 |
| 2,106,703 | Cox et al. | Feb. 1, 1938 |
| 2,137,007 | Schrauth et al. | Nov. 15, 1938 |
| 2,151,185 | Carruthers | Mar. 21, 1939 |
| 2,158,107 | Carruthers | May 16, 1939 |
| 2,196,758 | Dickey | Apr. 9, 1940 |
| 2,207,702 | Straughn | July 16, 1940 |
| 2,290,128 | Loder | July 14, 1942 |
| 2,350,388 | Claborn | June 6, 1944 |
| 2,359,750 | Collins | Oct. 10, 1944 |
| 2,388,164 | Loder | Oct. 30, 1945 |

FOREIGN PATENTS

| Number | Country | Date |
| --- | --- | --- |
| 445,223 | Great Britain | Apr. 6, 1936 |
| 505,651 | Great Britain | May 8, 1939 |